(12) United States Patent
Riley et al.

(10) Patent No.: US 7,850,371 B2
(45) Date of Patent: Dec. 14, 2010

(54) FIBER OPTIC CABLE INTERFACE COVER AND METHOD OF OPERATING THE SAME

(75) Inventors: Mike C Riley, Raleigh, NC (US); Anthony P Noto, Knightdale, NC (US); Clifford T Jones, Raleigh, NC (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/428,144

(22) Filed: Apr. 22, 2009

(65) Prior Publication Data

US 2010/0129032 A1  May 27, 2010

Related U.S. Application Data

(60) Provisional application No. 61/200,193, filed on Nov. 25, 2008.

(51) Int. Cl.
*G02B 6/38* (2006.01)
*G02B 6/36* (2006.01)
*H01R 13/44* (2006.01)

(52) U.S. Cl. ............... 385/77; 385/75; 439/142; 439/144

(58) Field of Classification Search ............... 385/53, 385/75, 77, 81; 439/142, 144
See application file for complete search history.

(56) References Cited

U.S. PATENT DOCUMENTS

| | | | | |
|---|---|---|---|---|
| 3,659,248 A | * | 4/1972 | Mann et al. ............ | 439/144 |
| 5,030,120 A | * | 7/1991 | Hartley ................. | 439/144 |
| 5,174,785 A | * | 12/1992 | Endo et al. ............ | 439/489 |
| 5,747,739 A | * | 5/1998 | Moeller ................. | 174/67 |

* cited by examiner

*Primary Examiner*—Daniel Petkovsek
(74) *Attorney, Agent, or Firm*—RG & Associates LLC (57) ABSTRACT

A cable interface housing cover is disclosed. The cable interface housing cover is connected to a cable interface portion of a cable interface housing. The cable interface housing cover includes a U-shaped portion and a hinged portion connected to a rotating axis. The hinged portion is configured to rotate about the rotating axis upon being handled by the end user to expose the cable interface housing to allow a cable to be inserted into the cable interface housing once the housing cover is lifted via a lifting operation.

8 Claims, 7 Drawing Sheets

FIBER OPTIC CABLE INTERFACE COVER AND METHOD OF OPERATING THE SAME

CROSS REFERENCE TO RELATED APPLICATIONS

The present patent application is related to and claims the benefit and priority of U.S. provisional patent application No. 61/200,193, filed Nov. 25, 2008, the entire contents of which are incorporated by reference herein.

FIELD OF THE INVENTION

The present inventive concept is related to a cable interface cover that is configured to protect a cable interface housing and to provide a securing mechanism for supporting the cable at the interface.

BACKGROUND OF THE INVENTION

Fiber optic cables are quickly replacing older types of cabling, such as, coaxial cable, telephone cable and other forms of cable which do not provide the data bandwidth currently demanded by today's end user. For example, common fiber optic related terms, such as, fiber to the node/neighborhood (FTTN), fiber to the cabinet (FTTCab), fiber to the curb (FTTC), fiber to the building (FTTB) and fiber to the home (FTTH) are commonly referred to when describing the various instances of how fiber optic cables are becoming a large part of everyday life.

Fiber optic cables provide increased reliability, bandwidth capacity and other advantages. However, there are certain drawbacks to using fiber optic cables, one of which is the delicateness of the glass core of a fiber optic cable. The glass in the fiber optic cable can be easily compromised by bending or wear and tear on the cable, which, in turn, renders the cable useless. As end users are coming into contact with fiber optic cables more than ever before, one of the most likely points-of-error is at the interface between the fiber optic cable and the hardware device to which the fiber optic cable connects.

One problem experienced at the interface of the fiber optic cable and its respective hardware device interface, is that some cable connectors may be easily disconnected if grabbed or pulled. Even a deliberate disconnection may not be desirable. Another concern is that a disconnection by an adult or child may cause eye damage if they looked into the end of the cable connector and if the power being transmitted down the fiber is high enough to cause eye damage. Another concern is that, if disconnected, the device will no longer function and will terminate all services being provided by the fiber transmission (e.g., telephone, Internet and/or television, etc.). Such a disconnection of service may cause both the user and service provider dissatisfaction and contention. When a service provider is involved (i.e., those that provide the data transmission), they may not even want the end user to have access to the optical connection.

The hardware device where the fiber optic signal enters may be referred to as an optical network terminal (ONT). An ONT is an electronic device that sits in and/or on a dwelling and includes a fiber optic cable feed from a service provider (e.g., Verizon, AT&T, Qwest, etc.). From the ONT, copper feeds for the services are routed within the dwelling (e.g., coax, twisted pair, Ethernet cable, etc.) to the electronic devices (e.g., set-top box, phone, router, etc.). Some or all of the feeds may be wireless or even optical. The end user hardware device (i.e., a cable box, internet modem, phone, DVD player, etc.) has an interface where the copper wires, coax cable or potentially fiber optic cable are to be connected. Once the hardware device is connected to the fiber optic cable feed, fiber optic signals may be processed into electronic signals which are used to process the data and provide an application for the end user (i.e., play video and/or audio on a DVD player).

Currently, while many optically fed hardware devices today are not subject to the above disconnection issues, those that are subject tend to enclose the fiber in a separate compartment that includes a cover. In operation, a user would have to remove the cover on the hardware device to access the connector. Once the fiber optic cable interface is inserted into the compartment, the fiber cable would protrude from that compartment without any strain relief assurance measure.

Removing the cover from the compartment in order to insert the fiber optic cable is an operation required by the user. In addition, the bulkiness, size and complexity of the compartment are all factors that increase design difficulty and accrue additional costs. For example, the hardware device overall size is larger since it has to account for the fiber connector, finger access & internal fiber bend radii.

Optimizing the design, size, strain relief characteristics and simplicity of the ONT can reduce problems experienced by the end user, service provider and reduce production and deployment costs. Providing protected optic connection access to an ONT and reducing the likelihood that the fiber optic connector becomes disconnected will help to ensure safety and reduce service downtime. This may also reduce replacement costs for damaged cable and provide a more reliable product to end users.

SUMMARY OF THE INVENTION

Disclosed is an optimized cable interface cover that is configured to protect a cable interface housing and to provide a securing mechanism to support the cable at the interface.

One example embodiment of the present inventive concept includes a cable interface housing cover connected to a cable interface portion of a cable interface housing. The cable interface housing cover includes a U-shaped portion that protects a cable once it is inserted into the cable interface housing. The cable interface housing cover also comprises a hinged portion connected to a rotating axis. The hinged portion is configured to rotate about the rotating axis upon being handled by an end user to expose the cable interface housing to allow a cable to be inserted into the cable interface housing once the housing cover is lifted via a lifting operation.

Another example embodiment of the present inventive concept includes a method for adjusting a cable interface housing cover connected to a cable interface portion of a cable interface housing. The method includes rotating a hinged portion of the cable interface housing cover about a rotating axis upon being handled by an end user to expose the cable interface housing to allow a cable to be inserted into the cable interface housing once the housing cover is lifted via a lifting operation. This provides a U-shaped protective cover over the cable.

Another example embodiment of the present inventive concept includes a cable interface housing cover connected to a cable interface portion of a cable interface housing. The cable interface housing cover includes a screw portion provides a securing mechanism that may be loosed or tightened to secure the cable interface housing cover to the cable interface housing.

DETAILED DESCRIPTION OF THE PREFERRED EMBODIMENTS

Figure 1:
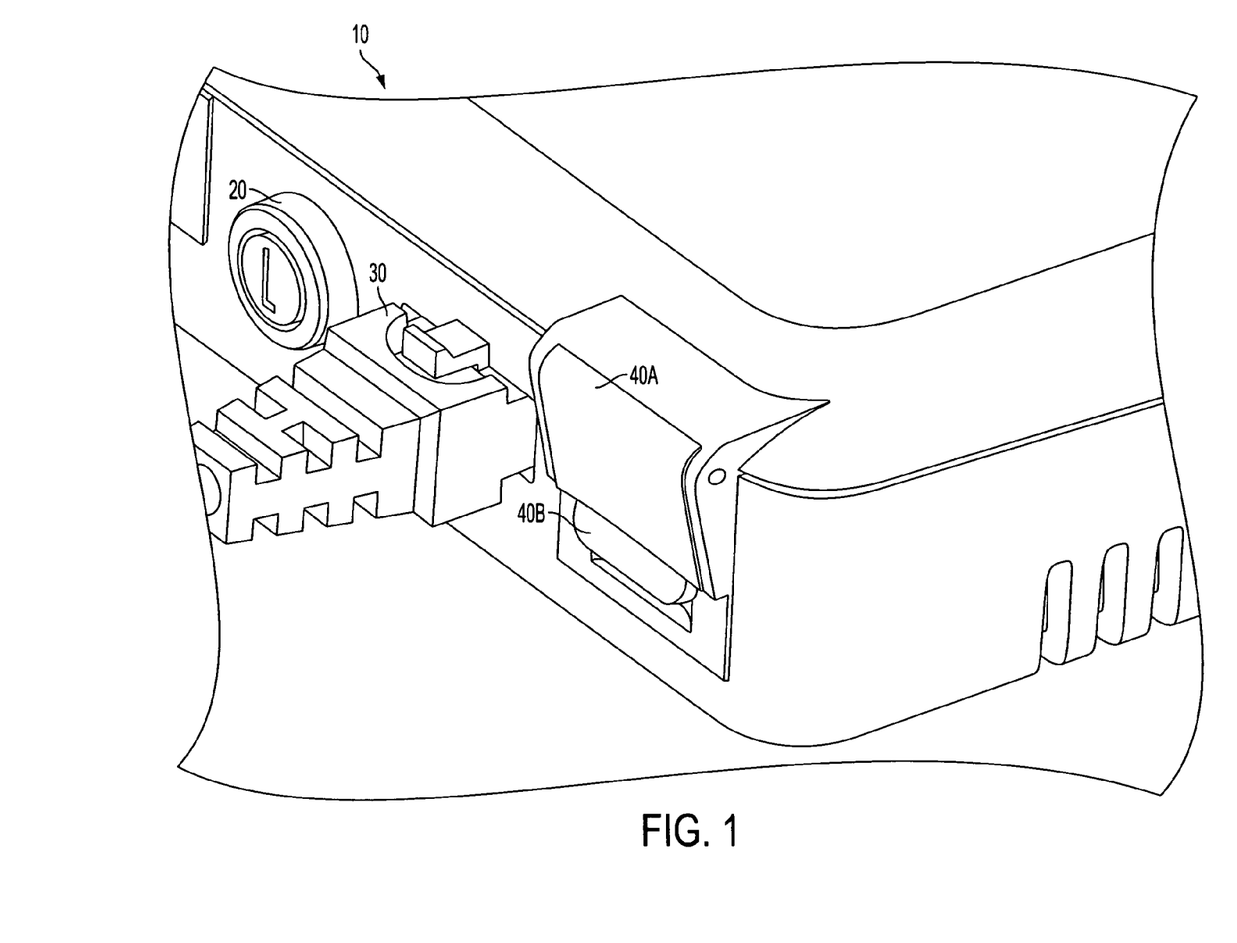
FIG. 1 illustrates an example fiber optic interface cover according to an example embodiment of the present inventive concept.

FIG. 1 illustrates a hardware device that includes an example fiber optic interface according to an example embodiment of the present inventive concept. Referring to FIG. 1, a hardware device 10 includes an exemplary power button 20, a conventional cable interface 30, and a fiber optic housing interface cover 40 that includes two portions 40A and 40B. The fiber optic housing interface cover 40 includes a latching mechanism at the interface of the fiber optic connector and the enclosure body (located inside the fiber optic housing interface cover 40). The hardware device may be, for example, an ONT, a laptop computer, a DVD player, a cable set-top box, etc. The fiber optic housing interface cover 40 also provides a U-shaped cover to further protect the cable from outside interference and damage.

The fiber optic housing interface cover 40 includes a hinged security latch with a hinged pivoting portion 40A that moves up and down by rotating around a pivotal rotating axis point located at the connection point between the hinged pivoting portion 40A and the upper portion of the fiber optic housing interface cover 40 to expose the fiber optic housing interface cover and to allow a fiber optic cable to be placed inside the fiber optic housing interface cover 40.

Alternatively, the hinged pivoting portion 40A may be instead a sliding latch that allows the fiber optic housing interface cover 40 to slide across the fiber optic interface. Regardless of the type of configuration (i.e., hinged or sliding), the latch mechanism (as illustrated in FIG. 1) is configured to cover the connector body and the fiber optic housing interface to block the fiber optic connector from pulling out of the fiber optic housing.

The fiber optic housing interface cover 40 also includes a bent portion or folding portion 40B, which acts as a protector to cover the fiber optic housing and reduce the chances that debris or dust forms inside the housing. The folding portion 40B may be bent at a predetermined angle to provide a curved tip that is accessible by the end user to pinch between their pinching fingers. The curved tip of the bent folding portion 40B provides a handle mechanism for the end user to grip and lift the fiber optic housing interface cover 40 to allow a fiber optic cable to be inserted inside the housing.

Some example fiber optic connectors used with fiber optic cables may include, for example, Lucent connectors (LC), duplex LC connectors, straight tip (ST) connectors, Toshiba link (TOSLINK) connectors, and subscriber or standard connectors (SC). For purpose of describing the example embodiments of the present inventive concept, SC connectors will be described with reference to the figures.

Figure 2:
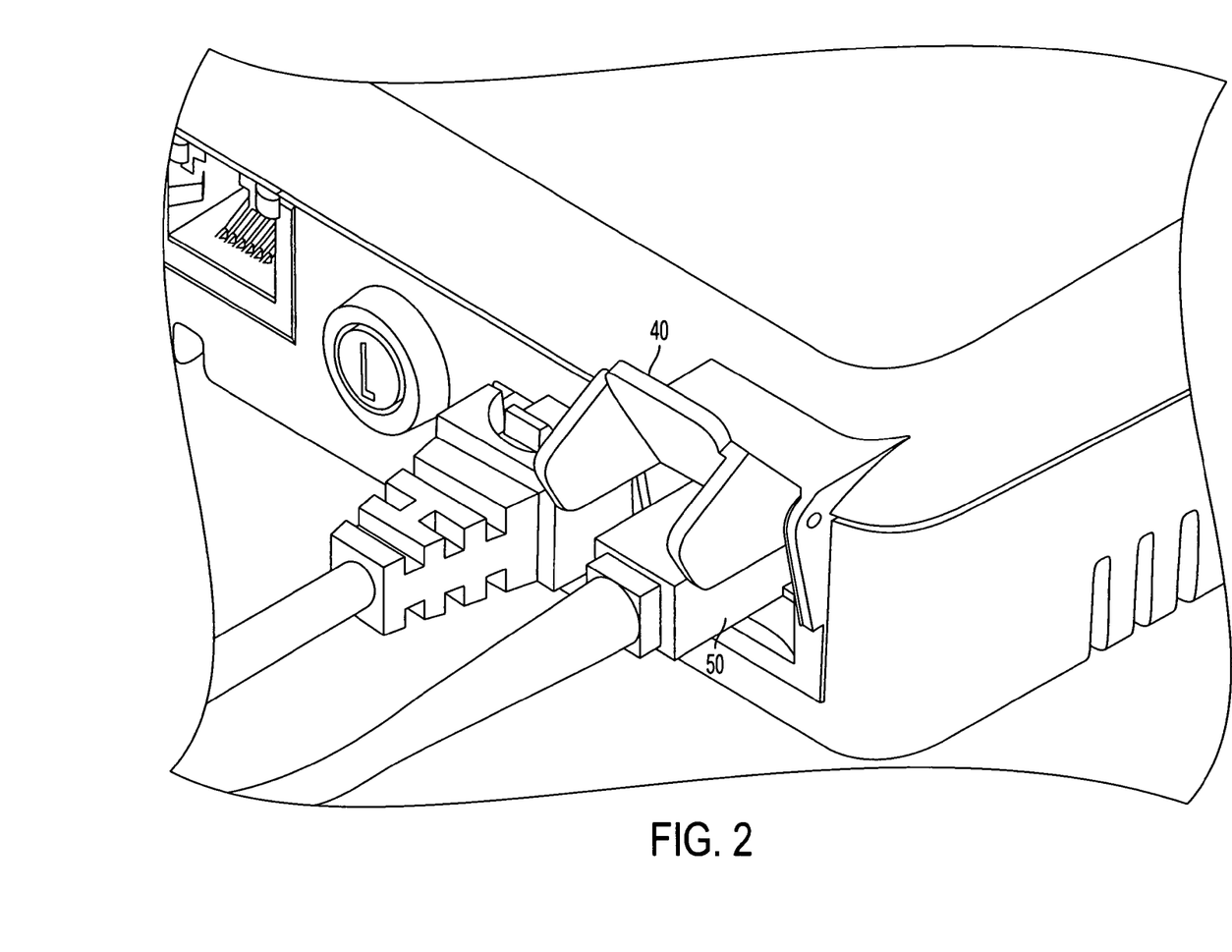
FIG. 2 illustrates an example fiber optic interface cover in an upward position according to an example embodiment of the present inventive concept.
Figure 3:
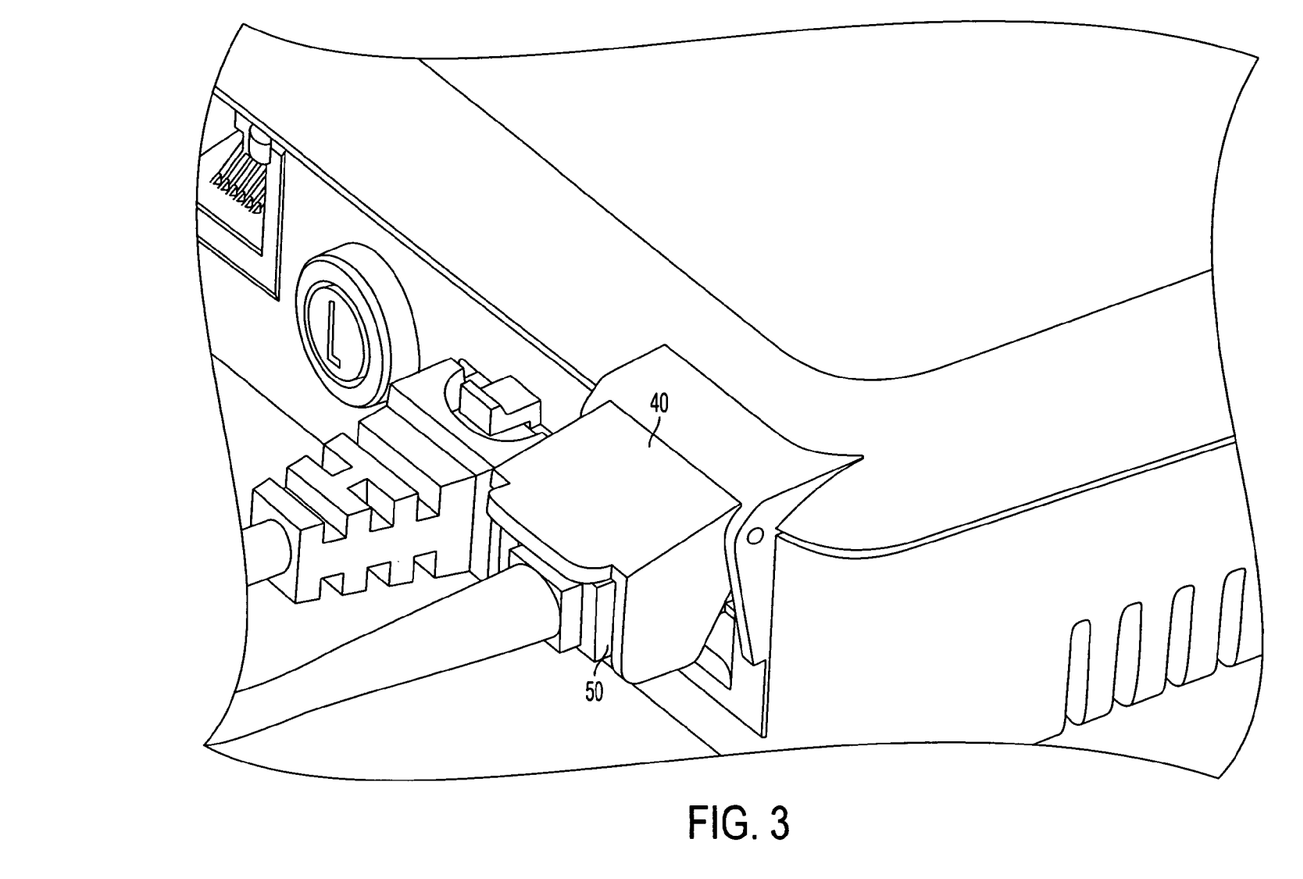
FIG. 3 illustrates an example fiber optic interface cover in a downward position according to an example embodiment of the present inventive concept.

The SC fiber optic connector 50 illustrated in FIGS. 2 and 3 is configured to mate with the fiber optic housing inside the fiber optic housing interface cover 40. Referring to FIG. 2, the fiber optic housing interface cover 40 may be operated like a latch, which includes the hinged portion 40A and the folding portion 40B. In operation, the latch of the fiber optic housing interface cover 40 is raised to allow the SC fiber optic connector 50 to mate with the fiber optic housing. For example, the latch portion is lowered and sits over and behind the SC fiber optic connector 50, providing a natural support mechanism. The supporting force may be provided by a spring coefficient from the recessing force of the material of the latch portion of the fiber optic housing interface cover 40. Additionally, the supporting force may also be provided by the gravity of the fiber optic housing interface cover 40 pressing against the mated SC fiber optic connector 50 to provide a securing force.

Referring to FIG. 3, the latch is illustrated as being lowered to a certain level that is in contact with at least a portion of the SC fiber optic connector 50. The latch may lower automatically as a result of its natural recessing force based on a spring coefficient resulting from a stretching of the material of the latch. Alternatively, the latch may have discrete step supports that support its position, which may be located inside or alongside the fiber optic housing interface cover 40 (i.e. similar to a gas pump handle or with detents in the hinge used to cover the interface).

The position of the fiber optic interface housing (up, down or pressing against the inserted SC fiber optic connector 50) provides a visible indicator to ensure that the SC fiber optic connector 50 is fully seated inside the fiber optic housing interface cover 40. If the SC fiber optic connector 50 is not fully seated, the latch will not close properly against the SC fiber optic connector 50 and will remain at an elevated angle above the fiber optic connector 50, similar to its position in FIG. 2. Another feature of the fiber optic interface housing 40, is that it provides a securing mechanism to reduce the likelihood that the SC fiber optic connector 50 will become unmated and/or disconnected from the fiber optic housing interface cover 40. In other words, the end user will have to lift or slide the fiber optic housing interface cover 40 prior to disconnecting the SC fiber optic connector 50.

Figure 4:
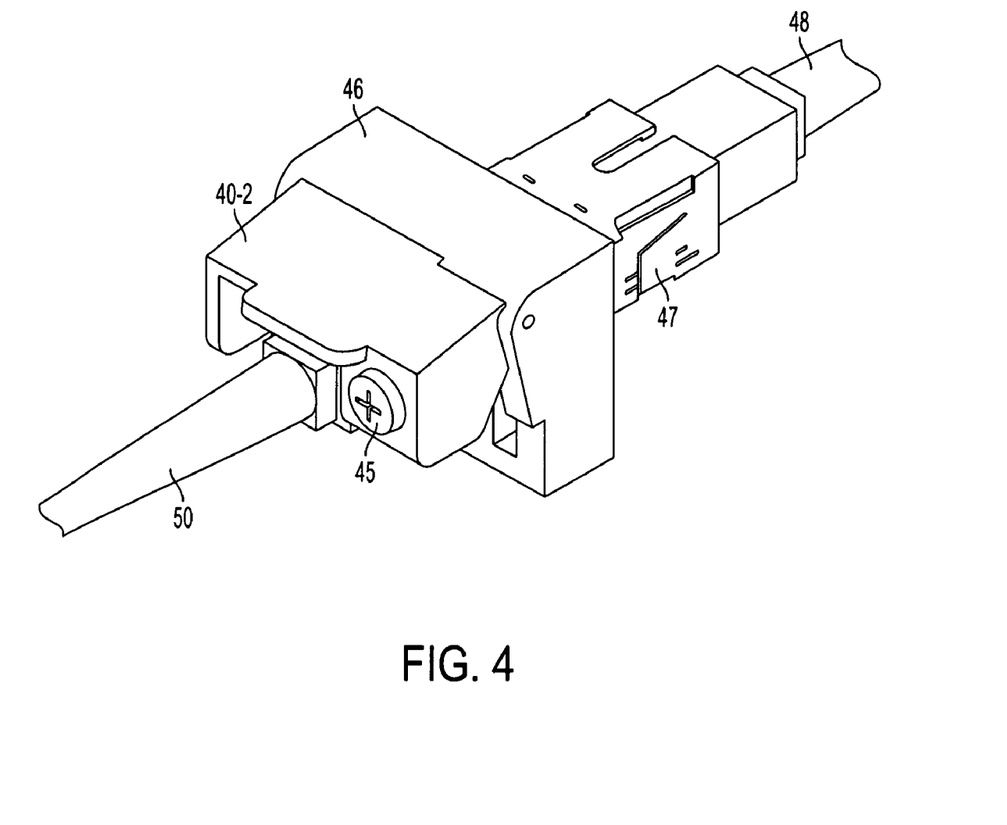
FIG. 4 illustrates another example fiber optic interface cover that includes a screw securing mechanism according to an example embodiment of the present inventive concept.

The SC fiber optic connector 50 (as illustrated in FIGS. 2-4, may be a push/pull connector. By allowing the fiber optic housing interface cover 40 to lie across the connector 50 and cover its body, this may also reduce the chances that the connector 50 becomes unmated. For example, the connector 50 will not become unmated as the interface 40 must be lifted to unlatch the connector 50 from its respective adaptor/coupler housing.

When there is no connector 50 connected (see FIG. 1) the latch of the fiber optic housing interface cover 40 acts as a dust cover and protector for the fiber optic adaptor/coupler inside the housing.

In another example embodiment, a fiber optic housing interface securing screw 45 is used to hold the fiber optic housing interface cover 40-2 into place. For example, the fiber optic housing interface cover 40-2 may operate similar to the fiber optic housing interface cover 40 of FIGS. 1-3. However, FIG. 4 illustrates an additional portion of the fiber optic housing interface cover 40 which holds the securing screw 45 and which is fastened against a fiber optic housing (external portion) 46.

In operation, the fiber optic interface housing 40 is opened by loosening the securing screw 45, and the SC fiber optic cable 50 is placed inside the housing of the hardware device. Once the SC fiber optic cable 50 is in the correct position, the housing interface cover 40-2 may be secured by tightening the securing screw 45. By tightening the securing screw 45, the SC fiber optic cable 50 cannot be easily disconnected. The SC fiber optic cable 50 will then be fixed in position inside the fiber optic housing (external portion) 46 and the internal portion 47. This allows the SC fiber optic cable 50 to be in contact with the internal hardware device cable 48 of the respective hardware device.

Although, the focus of the above examples has been primarily based on the hinged version of the fiber optic housing interface cover 40, a similar configuration and result may be provided by offering a slide housing interface approach. For example the housing interface cover 40 may slide from side-to-side or up and down to protect the internal housing and to hold the SC fiber optic cable into position. Additional features can also be added to include a tamper indicating label, which could be placed across the seam of the housing interface cover to illustrate a fresh untampered seal that has not been disrupted.

Figure 5:
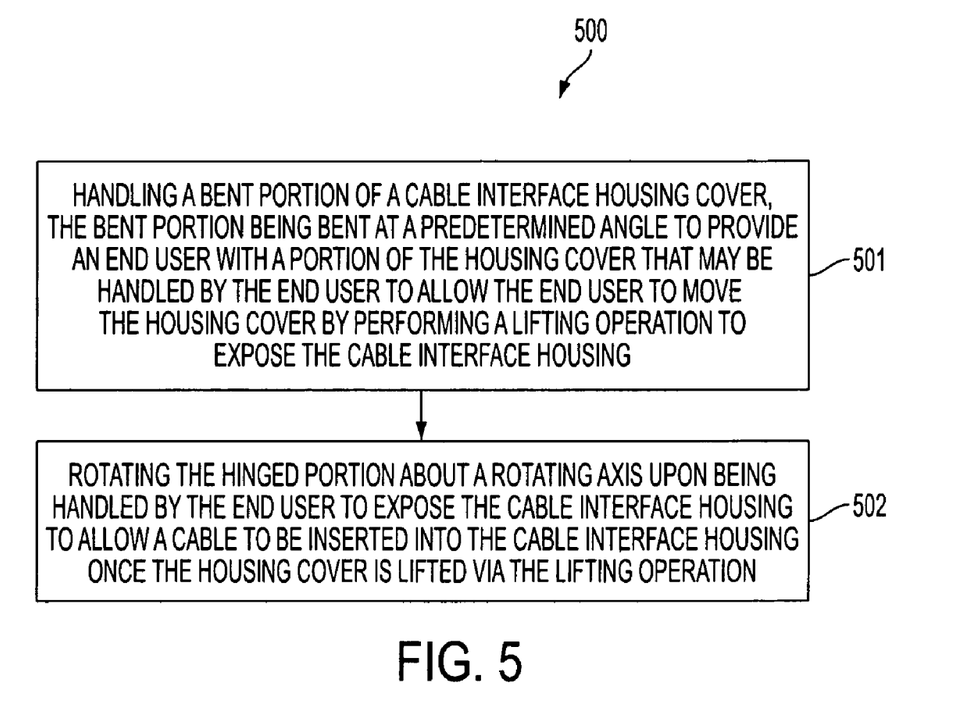
FIG. 5 illustrates an example flow diagram that illustrates a method according to an example embodiment of the present inventive concept.

An example method is illustrated in the flow diagram 500 of FIG. 5. Referring to FIG. 5, operation 501 describes handling a bent portion of a cable interface housing cover, the bent portion is bent at a predetermined angle to provide an end user with a portion of the housing cover that may be handled by the end user to allow the end user to move the housing cover by performing a lifting operation to expose the cable interface housing. Operation 502 describes rotating the hinged portion about a rotating axis upon being handled by the end user to expose the cable interface housing to allow a cable to be inserted into the cable interface housing once the housing cover is lifted via the lifting operation.

Figure 6:
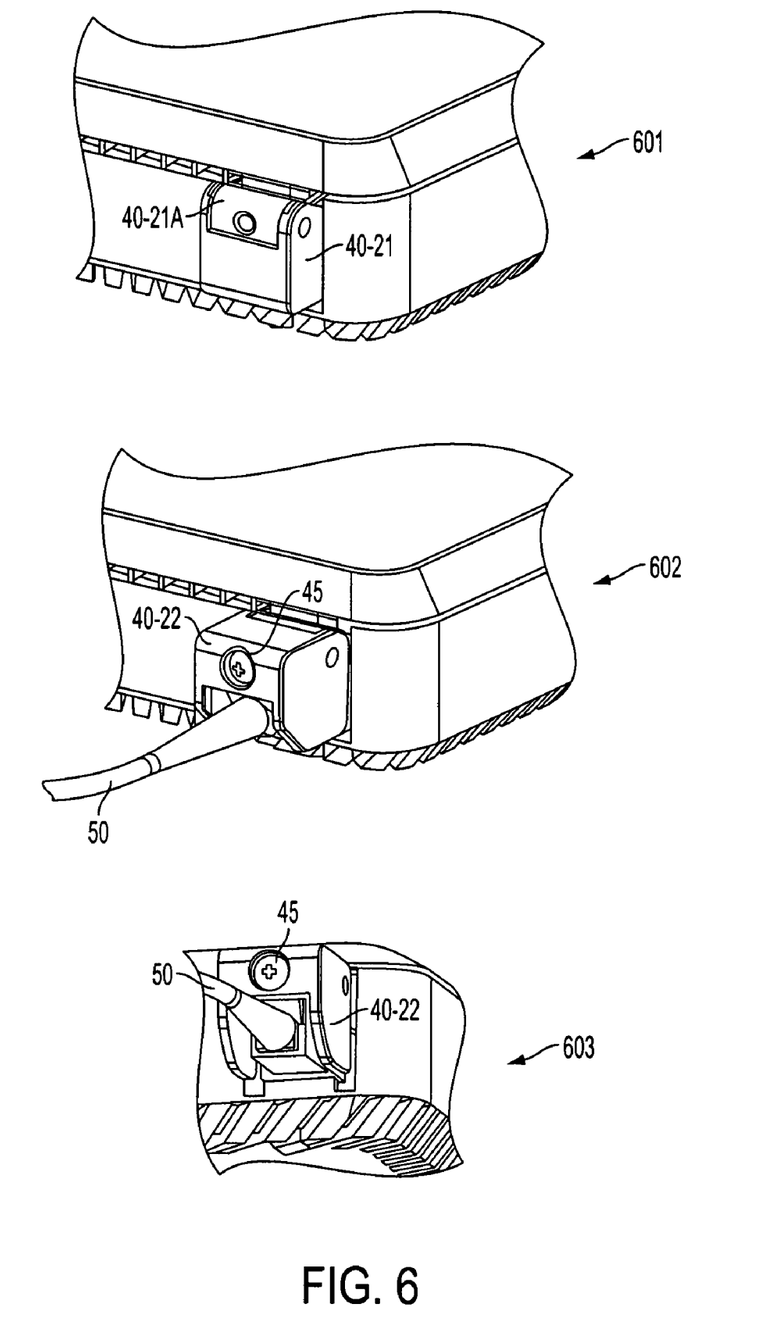
FIG. 6 illustrates additional example embodiments of the present inventive concept.

FIG. 6 illustrates another example embodiment of the present inventive concept. Referring to FIG. 6, a first example embodiment is illustrated as 601 which has a fiber optic housing interface cover 40-21 and a hinged pivoting portion 40-21A of the same. In another example embodiment 602, fiber optic interface housing cover 40-22 includes a securing screw 45 substantially centered on the housing cover 40-22. Example 603 is merely an upside-down view of example 602. Both 602 and 603 provide a pivoting fiber optic housing interface cover 40-22 and a securing screw 45 to secure the cover in place once the cable 50 has been inserted into the housing.

Figure 7:
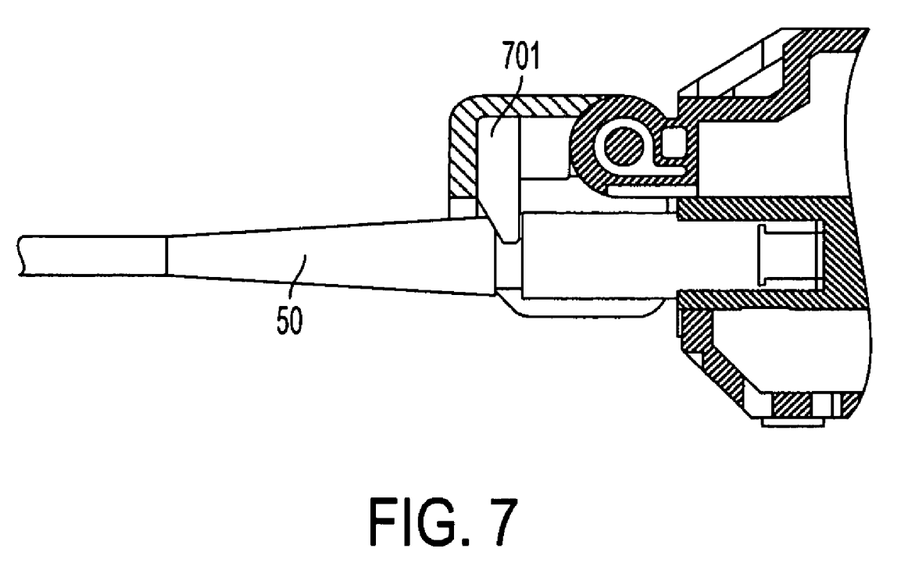
FIG. 7 illustrates yet another example embodiment of the present inventive concept.

FIG. 7 provides yet another example embodiment, which, by way of example, may be incorporated into any of the above-noted example embodiments or may be its own embodiment. Referring to FIG. 7, a blocking portion 701 provides a mechanism to clamp or sit behind a SC connector portion of the SC cable 50, and, preferably straddle the SC cable 50. The blocking portion 701 may have a V-shaped angular head that provides a neatly angled meeting mechanism to conveniently secure itself behind the SC connector and around the cable 50. The blocking portion 701 provides a securing force against the cable by being neatly fitted against the cable connector inside the housing cover.

All of the above examples and embodiments allow for a relatively small enclosure to protect the fiber optic cable housing interfaces. These examples may reduce the costs securing fiber optic cable connections by reducing raw materials, mold cycle times, molding machine implementations. Additionally, these examples will not restrict end user finger access to the connectors, cables and related interfaces when requiring access to cable connections etc.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A cable interface housing cover connected to a cable interface portion of a cable interface housing, said cable interface housing cover comprising:
   a U-shaped portion that covers at least two sides of a cable inserted into the cable interface housing; and
   a hinged portion connected to the U-shaped portion and a rotating axis,
   wherein the hinged portion is configured to rotate about the rotating axis upon being handled by an end user to expose the cable interface housing via a lifting operation to allow the cable to be inserted into the cable interface housing.

2. The cable interface housing cover of claim 1, wherein the cable is inserted into the cable interface housing, and the cable interface housing cover naturally recesses and presses against the cable to provide a securing force against the cable.

3. The cable interface housing cover of claim 2, wherein the securing force against the cable is provided by at least one of a spring coefficient of a recessing force of the material of the cable interface housing cover, and, a blocking portion that is fitted against the cable inside the housing cover.

4. The cable interface housing cover of claim 1, wherein the cable interface housing cover is connected to an optical network terminal (ONT).

5. The cable interface housing cover of claim 1, wherein the cable interface housing cover is connected to a computer.

6. The cable interface housing cover of claim 1, wherein the cable interface housing cover is connected to a cable set-top hardware device.

7. The cable interface housing cover of claim 1, wherein the cable interface housing cover is connected to a DVD player.

8. The cable interface housing cover of claim 1, wherein the cable is a fiber optic cable.

* * * * *